United States Patent [19]

Ohyama et al.

[11] 4,428,027
[45] Jan. 24, 1984

[54] GAS-INSULATED SUBSTATIONS

[75] Inventors: Satoshi Ohyama, Yokohama; Isao Kamata, Sagamihara, both of Japan

[73] Assignee: Tokyo Shibaura Denki Kabushiki Kaisha, Kanagawa, Japan

[21] Appl. No.: 329,515

[22] Filed: Dec. 10, 1981

[30] Foreign Application Priority Data

Dec. 18, 1980 [JP] Japan .................. 55-178004

[51] Int. Cl.$^3$ ...................... H02B 1/04; H02B 7/06
[52] U.S. Cl. .................................. 361/333; 361/335; 361/341
[58] Field of Search ............... 361/333, 332, 335, 341; 200/50 AA; 307/17, 42, 83; 174/12 R

[56] References Cited

U.S. PATENT DOCUMENTS 3,378,731  4/1968  Whitehead ........................ 361/333
3,485,936 12/1969  Goodridge ....................... 174/12 R X
4,237,520 12/1980  Oishi et al. ..................... 361/333 X

FOREIGN PATENT DOCUMENTS 50-32455  3/1975  Japan ................................. 361/333

Primary Examiner—A. T. Grimley
Assistant Examiner—Gregory D. Thompson
Attorney, Agent, or Firm—Stevens, Davis, Miller & Mosher

[57] ABSTRACT

A gas-insulated substation comprises at least two transformers arranged side by side on a first floor, gas insulated switching apparatus including disconnecting switches disposed on a second floor at a level different from that of the first floor, and branch bus-bars extending vertically and parallelly from lead boxes which project from facing sides of the respective transformers, the branch bus-bars being connected to the disconnecting switches. The substation further comprises main bus-bars each interconnecting the transformers through the branch bus-bars, i.e. the disconnecting switches, so that a length of the main bus-bar is made to be substantially equal to a distance between the lead boxes projecting from the facing sides of the respective transformers.

5 Claims, 10 Drawing Figures

GAS-INSULATED SUBSTATIONS

BACKGROUND OF THE INVENTION

This invention relates to a gas-insulated substation of the type in which transformers are arranged on a first flat floor (plane) and a gas-insulated switching apparatus is arranged on a second flat floor (plane) above the first floor.

A substation of this type is disclosed, for example, in the Japanese Patent Laid-open Specification No. 32455/1975, in which transformers on the first floor are connected with the gas-insulated switching apparatus positioned at the upper portion thereof through branch bus-bars and the branch bus-bars are drawn out from one sides of transformers in the same direction, but there is no specific disclosure relating to the bus-bar arrangement interconnecting the respective transformers.

In a case where it is required to receive power from two circuits by using two transformers which are arranged on a floor in a substation different from that on which the gas-insulated switching apparatus is disposed, it is important to shorten the lengths of the branch bus-bars which interconnect the transformers and the gas-insulated switching apparatus and the length of a main bus-bar connecting the transformers with each other from a view point of compactness of the substation. Particularly, this fact is important for the substation installed in the interior of a building having a limited inner space. Generally, in a usual substation, primary sides of the respective transformers for receiving power are connected respectively to corresponding cable heads connected to power sources through the branch bus-bars with which disconnecting switches are connected and the intermediate portions of the disconnecting switches of the respective branch bus-bars are connected by the main bus-bar.

In an actual three-phase arrangement of the substation of the type described above, the branch bus-bars extend from the same one sides of two transformers in the same direction and the main bus-bars interconnect the both transformers through the branch bus-bars. Each of these main bus-bars in such arrangement has a considerably long length and heavy weight and this fact presents severe problems for the substation particularly installed in the interior of a building.

SUMMARY OF THE INVENTION

An object of this invention is to provide an improved gas-insulated substation capable of removing defects of the prior art substation.

Another object of this invention is to provide a gas-insulated substation in which the lengths of the main bus-bars interconnecting transformers can be shortened.

According to this invention there is provided a gas-insulated substation of the type comprising a plurality of transformers parallelly arranged on a first floor, gas-insulated switching apparatus disposed on a second floor at a level different from that of the first floor, the switching apparatus including disconnecting switches, branch bus-bars extending vertically from lead boxes of the transformers, and main bus-bars interconnecting the transformers through the branch bus-bars, and the gas-insulated substation is characterized in that the lead boxes of at least two of the transformers project from facing sides of the respective transformers arranged side by side, the branch bus-bars connected to the lead boxes extend parallelly with each other and are connected to the disconnecting switches, and each of the main bus-bars interconnects the disconnecting switches so that a length of the main bus-bar is made to be substantially equal to a distance between the lead boxes projecting from the respective transformers.

DESCRIPTION OF THE PREFERRED EMBODIMENTS

Figure 1:
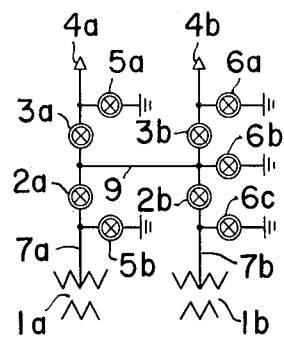
FIG. 1 shows one example of a skeleton diagram of a gas-insulated substation of a usual type to which this invention is applicable.
Figure 3:
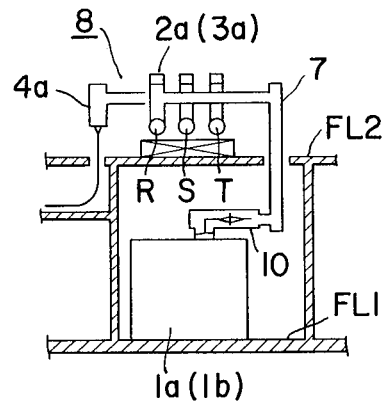
FIGS. 2 and 3 are schematic diagrams showing gas-insulated substation of a prior art having a three-phase construction connected according to the skeleton diagram shown in FIG. 1.
Figure 2:
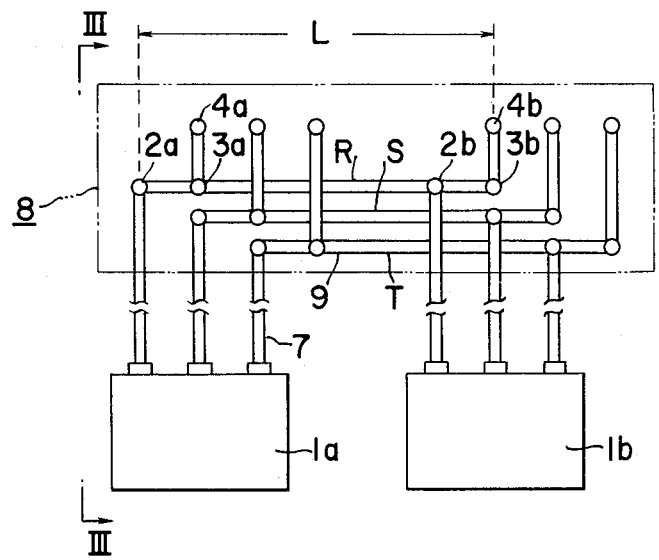

As conducive to a full understanding of the exact nature of this invention, general aspect of a gas insulated substation and problems encountered in a known type thereof will first be considered in conjunction with FIG. 1 through FIG. 3.

FIG. 1 shows a single line skeleton diagram of a gas-insulated substation of a usual type, in which primary sides of two transformers 1a and 1b are respectively connected to corresponding cable heads 4a and 4b connected to power sources, not shown, through branch bus-bars 7a and 7b which are provided with disconnecting switches 2a, 3a, and 2b, 3b, respectively. In an actual installation, three phase arrangement is generally adopted and three bus-bars and three disconnecting switches are used for each phase. A main bus-bar 9 is arranged to interconnect junctions between disconnecting switches 2a and 3a, and 2b and 3b. Reference numerals 5a, 5b, 6a, 6b and 6c designate grounding switches.

FIGS. 2 and 3 show a substation having a three-phase (R, S, T) construction connected according to the single line skeleton diagram shown in FIG. 1. Lead boxes of each phase of the transformers 1a and 1b parallelly arranged on the first floor FL1 extend from the transformers in the same direction and are connected through oil-gas bushings 10 to the branch bus-bars 7 which are connected to a gas-insulated switching apparatus 8 (called GIS, hereinafter) positioned on the second floor FL2 arranged above the first floor FL1. The GIS8 is arranged so that the gas insulated main bus-bars 9 of each phase R, S, and T are parallel to the top surfaces of transformers 1a and 1b arranged side by side and the main bus-bar of each phase is connected to the branch bus-bars of the corresponding phase through the disconnecting switches, whereby the transformers 1a and 1b are interconnected through the main bus-bars 9.

With the substation constructed as shown in FIGS. 2 and 3, the branch bus-bars 7 extend from the lead boxes 10 in the same direction and from the same sides of the respective transformers and are connected to the main bus-bars 9 each having a considerably long length L between the disconnecting switches 2a and 3b. The fact that the long and heavy main bus-bars must be used presents a severe problem for the substation which is installed in a building because of the increase of the installation space and the strengthening of the supporting structure of the main bus-bars. On another point of view, although it may be considered to arrange the disconnecting switch 3b of each phase to a position on the lefthand side, as viewed in FIG. 2, of the disconnecting switch 2b, in this case it is also necessary to use a considerably long main bus-bar 9 between the disconnecting switches 2a and 2b for each phase. At any case, it is necessary to use a long main bus-bar having a length between the lead boxes of each phase of the respective transformers 1a and 1b.

This invention is made by taking into consideration the problem encountered in the known substation as described above and will be described hereunder in conjunction with FIG. 4 through FIG. 10.

Figure 4:
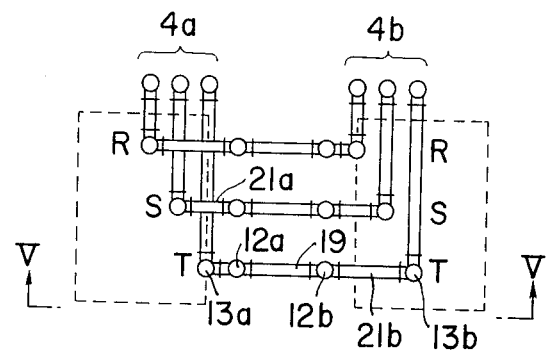
FIG. 4 is a schematic diagram showing a gas-insulated substation embodying the invention and having a three-phase construction connected according to the skeleton diagram shown in FIG. 1.
Figure 5:
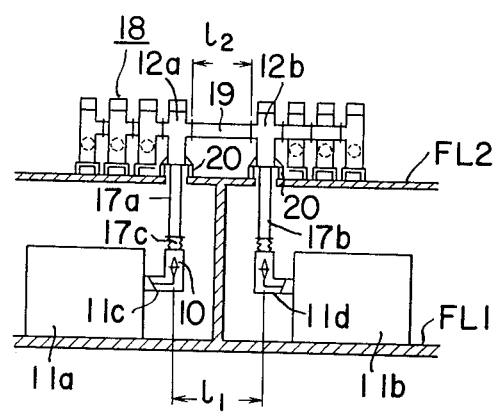
FIG. 5 is a side view of the gas-insulated substation as viewed in a direction of the line V—V in FIG. 4.

FIGS. 4 and 5 show an embodiment of a substation of this invention having a three-phase construction, in which two transformers 11a and 11b are arranged side by side on the first flat floor FL1. The transformers 11a and 11b are provided with lead boxes 11c and 11d, for three-phase bus-bars, extending from the opposing side surfaces of the respective transformers and the front ends of the lead boxes 11c and 11d are connected to one ends of gas insulated branch bus-bars 17a and 17b through oil-gas bushings 10 so as to extend vertically. The other ends of the branch bus-bars 17a and 17b are connected to disconnecting switches 12a and 12b which constitute disconnecting portions of GIS 18 mounted on the second flat floor FL2 positioned above the transformers 11a and 11b. In some case it is desirable to dispose expansible bus-bars 17c between the lead boxes 11c and 11d and the branch bus-bars so as not to transmit vibration from the transformers to GIS 18. The disconnecting switches 12a and 12b of each phase R, S or T are vertically secured onto the second floor FL2 by supporting devices 20 and these switches are electrically connected in series through a gas insulated main bus-bar 19. In such arrangement of the substation as described above, the length l₂ of the main bus-bar 19 can be made to be equal with the distance l₁ between the axes of the lead boxes 11c and 11d of the transformers 11a and 11b. Disconnecting switches 13a and 13b are also electrically connected in series in each phase R, S, or T to the disconnecting switches 12a and 12b through gas insulated connection bus-bars 21a and 21b which are disposed on the side opposing to the side on which the main bus-bar 19 is arranged. The disconnecting switches 13a and 13b are connected through branch bus-bars to cable heads 4a and 4b connected to power sources, not shown.

According to the construction of the substation of this invention described hereinabove, the branch bus-bars extend vertically upwardly from the lead boxes which extend from the opposing sides of two transformers on the first floor towards the respective opposing sides, and the branch bus-bars are connected to the gas insulated switching apparatus on the second floor, so that the main bus-bar interconnecting the branch bus-bars of each phase can be considerably shortened in comparison with known-arrangement of a substation. For this reason, the substation can be constructed compactly and the installation space therefor can be usefully utilized, which features are greatly effective in a case where the substation is to be installed in a building. Moreover, since the main bus-bar 19 can be supported by the disconnecting switches 12a and 12b, supporting members required therefor in a prior type substation can be eliminated and this fact results in the reductions of the weight of the substation and the installation cost therefor.

Figure 6:
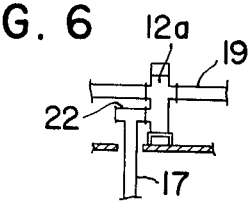
FIG. 6 shows an example of a portion interconnecting a branch bus-bar and a disconnecting switch according to this invention.

In another preferred example, a T-shaped bus-bar can be used for connecting the branch bus-bar 17 (17a, 17b) to the disconnecting switch 12 (12a, 12b) as shown in FIG. 6 instead of directly connecting the branch bus-bar 17 to the disconnecting switch 12 as shown in FIG. 5. In this case, the respective parts or members on the GIS side and transformer side can be independently maintained and inspected, whereby the working efficiency can be improved. The lead boxes 11c and 11d may be disposed on the opposing portions of the upper sides of the both transformers 11a and 11b.

Figure 7:
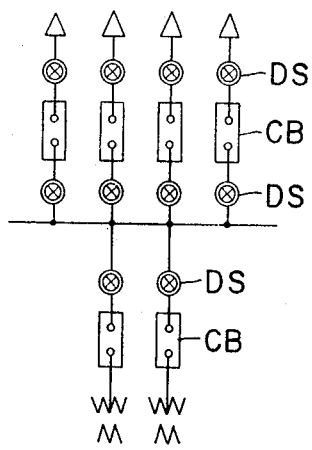
FIGS. 7 through 9 show other examples of skeleton diagrams of a gas-insulated substation of usual types to which this invention is applicable.
Figure 8:
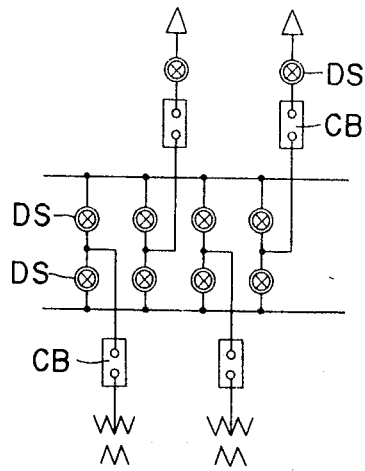

FIG. 7 shows a skeleton diagram of a substation having a single bus-bar arrangement including disconnecting switches DS and circuit breakers CB, and FIG. 8 also shows a skeleton diagram having double bus-bar arrangement. It will be easily understood that the substations shown in FIGS. 7 and 8 can be constructed as shown in FIGS. 4 and 5 according to the teaching of this invention.

Figure 9:
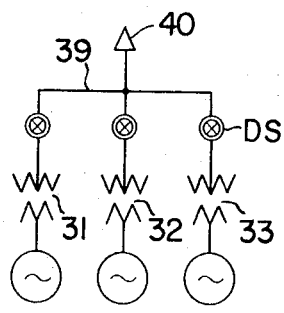
Figure 10:
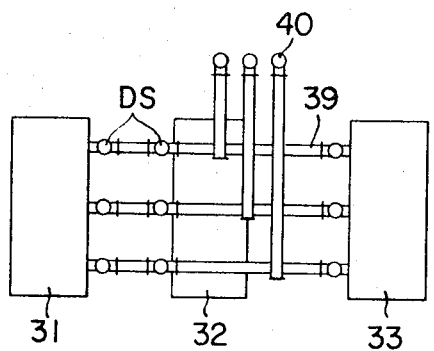
FIG. 10 is a schematic diagram showing an embodiment of this invention based on FIG. 9.

FIG. 9 shows an embodiment of an underground installation type power station according to this invention in which three transformers 31, 32 and 33 are arranged side by side on the same floor, and FIG. 10 shows an actual construction of the skeleton diagram shown in FIG. 9. The lead boxes of two transformers 31 and 32 are located on the side facing with each other and the lead boxes of the other transformer 33 are located so as to face the side of the transformer 32 as shown in FIG. 10. According to this construction, main bus-bars 39 interconnecting the respective transformers 31, 32, 33 can be shortened in comparison with a prior art construction in which the lead boxes are arranged on the upper sides of the respective transformers, and branch bus-bars 40 adapted to be connected to transmission lines can be disposed in a space of the second floor above the transformer 32, so that a space necessary to arrange GIS can be reduced.

With the embodiments of this invention described hereinabove, the first flat plane may be either the floor of an undergound room or the first floor of a building and the second flat plane may be a ground floor or the second floor of a building. As far as the transformers and the GIS are disposed on the different floors, it is not absolutely necessary to arrange the GIS directly above the transformers and they can be arranged on the different vertical areas. In another example, the transformers can be arranged on a floor above the floor on which the GIS is arranged.

Consequently, according to this invention, the lead boxes extend from the opposing sides of the respective transformers and the branch bus-bars connected to the lead boxes extend parallelly upwardly, so that the length of the main bus-bar interconnecting disconnecting switches arranged on the respective branch bus-bars can be reduced to a length equal to a distance between the axes of the branch bus-bars. This constructional merit results in compactness of a substation particularly which is installed in the interior of a building in which a gas insulated switching apparatus in arranged on a floor above a floor on which transformers are installed.

Although foregoing embodiments were described by taking a substation installed in a building as an example, since the object of this invention can also be attained in any indoor and outdoor electrical station, it is intended that the term "substation" used in the specification and appended claims includes any type of electric station including transformers, gas insulated switches, disconnecting switches and bus-bars.

What is claimed is:

1. In a gas-insulated substation of the type comprising a plurality of transformers parallelly arranged on a first floor, gas-insulated switching apparatus disposed on a second floor at a level different from that of said first floor, said switching apparatus including disconnecting switches, branch bus-bars extending vertically from lead boxes of said transformers, and main bus-bars interconnecting said transformers through said branch bus-bars, the improvement in which said lead boxes of at least two of said transformers project from facing sides of the respective transformers arranged side by side, said branch bus-bars connected to said lead boxes extend parallelly with each other and are connected to said disconnecting switches, and each of said main bus-bars interconnects said disconnecting switches so that a length of said main bus-bar is made to be substantially equal to a distance between said lead boxes projecting from the respective transformers.

2. The gas insulated substation according to claim 1 wherein said main bus-bars are supported by said disconnecting switches at both ends of said main bus-bars.

3. The gas-insulated substation according to claim 1 wherein front ends of said lead boxes are positioned on extensions of the axes of said disconnecting switches.

4. The gas-insulated substation according to claim 1 wherein said branch bus-bars are connected to said disconnecting switches by means of T-shaped connecting members.

5. The gas-insulated substation according to claim 1 wherein said branch bus-bars are connected to the front ends of the corresponding lead boxes by interposing an expansible members therebetween.

* * * * *